United States Patent
Eleftheriades et al.

(10) Patent No.: US 6,512,775 B1
(45) Date of Patent: Jan. 28, 2003

(54) METHOD AND APPARATUS FOR A PROGRAMMABLE BITSTREAM PARSER FOR AUDIOVISUAL AND GENERIC DECODING SYSTEMS

(75) Inventors: Alexandros Eleftheriades, New York, NY (US); Yihan Fang, New York, NY (US)

(73) Assignee: The Trustees of Columbia University in the City of New York ( * ) Notice: Subject to any disclaimer, the term of this patent is extended or adjusted under 35 U.S.C. 154(b) by 0 days.

(21) Appl. No.: 09/297,714

(22) PCT Filed: Nov. 8, 1996

(86) PCT No.: PCT/US96/17876
§ 371 (c)(1),
(2), (4) Date: Jul. 2, 1999

(87) PCT Pub. No.: WO98/21889
PCT Pub. Date: May 22, 1998

(51) Int. Cl.$^7$ .............................................. G06F 13/00
(52) U.S. Cl. ........................ 370/428; 341/51; 725/91; 708/203
(58) Field of Search ................................. 370/392, 428, 370/429, 485, 486, 487; 725/91, 94; 341/50; 708/203, 200

(56) References Cited

U.S. PATENT DOCUMENTS

| | | | |
|---|---|---|---|
| 5,067,104 A | | 11/1991 | Krishnakumar et al. |
| 5,168,356 A | * | 12/1992 | Acampora et al. ........... 370/473 |
| 5,189,671 A | * | 2/1993 | Cheng ........................ 359/118 |
| 5,231,484 A | * | 7/1993 | Gonzales et al. ........... 348/469 |
| 5,253,053 A | * | 10/1993 | Chu et al. ............... 375/240.23 |
| 5,371,547 A | | 12/1994 | Siracusa et al. |
| 5,414,650 A | | 5/1995 | Hekhuis |
| 5,452,006 A | | 9/1995 | Auld |
| 5,532,744 A | | 7/1996 | Akiwumi-Assani et al. |
| 5,559,999 A | | 9/1996 | Maturi et al. |
| 5,566,089 A | | 10/1996 | Hoogenboom |
| 5,570,197 A | | 10/1996 | Boon |

FOREIGN PATENT DOCUMENTS

EP 0627858 7/1994

* cited by examiner

*Primary Examiner*—Ajit Patel
(74) *Attorney, Agent, or Firm*—Baker Botts LLP

(57) ABSTRACT

A parser (100) for parsing a digital bitstream which includes both data information and programming information, where it is based on the programming information contained in the bitstream, is disclosed. The parser (100) included a buffer (110), a mode selector (200), a control circuit (300), and a data processor (400). The mode selector (200) determines whether one or more bits of the bitstream segment represent a mode selection code, and selects a parser mode in response to the mode selection code. The control circuit (300) receives and stores bits from the buffer when the bitstream parser (100) is in a program mode in order to reprogram the control circuit (300) with newly received program information, and uses the program information to generate one or more parsing signals when the bitstream parser (100) is in data mode. The data processor (400) received bits from the buffer (110) and parsing signals from the command circuit (300) when the bitstream parser is in the data mode, and parses the received bits in accordance with the parsing signals.

24 Claims, 5 Drawing Sheets

METHOD AND APPARATUS FOR A PROGRAMMABLE BITSTREAM PARSER FOR AUDIOVISUAL AND GENERIC DECODING SYSTEMS

BACKGROUND OF THE INVENTION

I. Field of the Invention

The present invention relates to techniques for parsing a digital bitstream, and more specifically, to programmable audiovisual and generic bitstream parsing techniques.

II. Description of the Related Art

In the digital environment, information is generally transmitted between systems in the form of coded bitstreams which represent audiovisual or other generic data. In order to be usable by the receiving system, not only must such coded bitstreams must be decoded, but the bitstream must be parsed, i.e., separated into semantically meaningful units or "objects."

For example, in the case of an MPEG-2 encoded bitstream, the bitstream must be parsed into slices and macroblocks before the information contained in the bitstream is usable by an MPEG-2 decoder. The MPEG-2 decoder uses the parsed bitstream to reconstruct the original audiovisual information.

In the past, the parsing operation has been performed by custom-manufactured hardware and/or software. Such bitstream parsers would be programmed to separate an incoming bitstream based on some preselected objective rules or criterion, such as the intrinsic characteristics of packets of information in the bitstream, or transitions in characteristics between consecutive packets of information. An example of such a parser is presented in U.S. Pat. No. 5,414,650 issued May 9, 1995, to Hekhuis.

However, a significant problem with such a bitstream parser lies in the fact that the parsing rules are inflexible to changes in the syntax of the incoming bitstream. For this reason, there have been several attempts to construct bitstream parsers which are in some sense "programmable" so that bitstreams with differing syntax can be accepted by the same parser by reprogramming, rather than replacing, the parser.

For example, U.S. Pat. No. 5,371,547, issued Dec. 6, 1994, to Siracusa et al., discloses an apparatus for excising and reinserting invariable and variable data from an MPEG video data stream in order to reduce transmission bandwidth. The apparatus includes a parser which separates transport header data and encoded MPEG payloads for presentation to an MPEG decoder in a suitable format. The parser, which examines each transport header to determine if the corresponding payload contains slice data, may be programmed to respond to the particular encoded protocol.

European Patent Application No. 94107818, published Jul. 12, 1994, of Matsushita Electric Industrial Co., Ltd. discloses an apparatus for re-compressing encoded video data into a more compact form that is suitable for recording on a digital storage medium. The apparatus includes a variable length decoder ("VLD") for parsing an input bitstream and for extracting quantization parameters and/or quantized coefficients from other information. The VLD is implemented by way of a programmable digital signal processor ("DSP"), which may extract coefficients or both parameters and coefficients.

While the above-mentioned techniques present bitstream parsers that are programmable by an external user, they fail to provide a fully flexible parser because an external programmer must reprogram the parser every time a new syntax is encountered by the parser. Accordingly, the prior art techniques do not provide for self-configuration of the parser based on the syntax of the bitstream, but require external programming to adapt to changes in the bitstream syntax. Therefore, there exists a need in the art for a bitstream parsing technique which is fully adaptable to the syntax used in the bitstream without the requirement of interrupting the parsing operation to reprogram the bitstream parser every time a new syntax is encountered.

SUMMARY OF THE INVENTION

An object of the present invention is to provide a bitstream parsing technique which is programmable by the bitstream itself.

A further object of the present invention is to provide a parsing technique which is capable of redefining objects, recognizing certain context-sensitive objects, and recognizing certain repetitive objects during the parsing operation.

A still further object of the present invention is to provide an audiovisual and generic bitstream parsing technique which is programmable by an incoming bitstream that contains programming software embedded into the audiovisual or generic data, so that the parsing process may be tailored depending on the specific application.

In order to meet these and other objects which will become apparent with reference to further disclosure set forth below, the present invention provides a parser for parsing a digital bitstream which includes both data information and programming information. The parser includes a buffer, a mode selector, a control circuit, and a data processor. The mode selector determines whether one or more bits of the bitstream segment represent a mode selection code, and selects a parser mode in response to the mode selection code. The control circuit receives and stores bits from the buffer when the bitstream parser is in a program mode in order to reprogram the control circuit with newly received program information, and uses the program information to generate one or more parsing signals when the bitstream parser is in a data mode. The data processor receives bits from the buffer and parsing signals from the command circuit when the bitstream parser is in the data mode, and parses the received bits in accordance with the parsing signals.

In a preferred arrangement, the buffer is a shift buffer having a plurality of parallel outputs for bits of the bitstream segment which it stores, and the parser includes one or more buffer isolation gates to isolate each parallel output of the shift buffer and to provide one or more non-isolated bits of the bitstream segment to the data processor and the control circuit.

In an especially preferred arrangement, the program mode selection and data mode selection codes are simply start and end program codes, respectively. In such an embodiment, the mode selector advantageously includes a first logic circuit which receives one or more bits of the bitstream segment from the buffer isolation gates, compares such bits with one or more bits of the start and end program codes, and generates a signal indicative of a program mode when a start code is determined or when a program mode signal was generated in an immediately previous cycle and an end code is not determined.

Such a mode selector also includes a second logic circuit generating a wait signal whenever the start or end program codes are determined by the first logic circuit, and providing the wait signal to the buffer isolation gates so that any gate corresponding to a bit position of the shift buffer containing a bit corresponding to the start or end program codes is disabled.

The control circuit may include a memory to receive and store program information for the bitstream parser and to receive and store the one or more bits of new program information, and to reprogram the stored program information when the new program information is received by the control circuit, as well as an instruction decoder circuit to retrieve program information from the memory and generating the one or more parsing signals based on the retrieved program information.

In another preferred arrangement, the control circuit also includes a program counter to generate addresses of storage locations in the memory to retrieve program information whenever the wait signal is not generated. The control circuit may generate a wait value signal, where the logic circuit is responsive to the wait value signal in generating the wait signal.

Advantageously, the instruction decoder can be connected to the mode selector to receive the mode signal, and to the buffer to receive new programming information, where one or more bits of the bitstream segment representing such programming information are stored in the memory only when the instruction decoder receives the program mode signal.

The instruction decoder circuit may also beneficially be linked to the data memory to retrieve previously processed data, where instruction decoder generates one or more parsing signals based on both retrieved program information and attributes of the retrieved data.

The present invention also provides a method for parsing a digital bitstream having both data information and programming information. The method requires receiving a segment of the digital bitstream in successive cycles; determining whether one or more bits of the received bitstream segment represents a mode selection code, where the mode selection code can be a data mode selection code or a program mode selection code; selecting a data mode when the data mode selection code is determined and a program mode when the program mode selection code is determined; storing one or more bits of the bitstream portion as new programming information when the program mode is selected; generating one or more parsing signals based on the stored programming information when the data mode is selected; and parsing the received bitstream in accordance with the generated parsing signals.

Preferably, the selecting step includes comparing the one or more received bits to the data and program mode selection codes, generating a signal indicative of a program mode when a program mode selection code is determined, or when a program mode signal was generated in an immediately previous cycle and a data mode selection code is not determined, generating a wait signal whenever either mode selection code is determined, and isolating one or more bits of the received bitstream portion which correspond to either mode selection code.

When the programming information includes one or more command instructions and is stored in an addressable program memory, the parsing signal generation step advantageously provides for determining addresses of a program memory where command instructions are stored, retrieving such command instructions from the stored programming information in the program memory, and generating the one or more parsing signals based on the retrieved command instructions whenever a wait signal is not generated.

When parsed data is provided to a data memory, the method also provides for the retrieving of preselected data from the data memory, determining addresses of the program memory where command instructions are stored, retrieving the command instructions from the stored program information in the program memory, and generating one or more parsing signals based on both the retrieved command instructions and the retrieved data.

The accompanying drawings, which are incorporated and constitute part of this disclosure, illustrate a preferred embodiment of the invention and serve to explain the principles of the invention.

DESCRIPTION OF THE PREFERRED EMBODIMENTS

Figure 1:
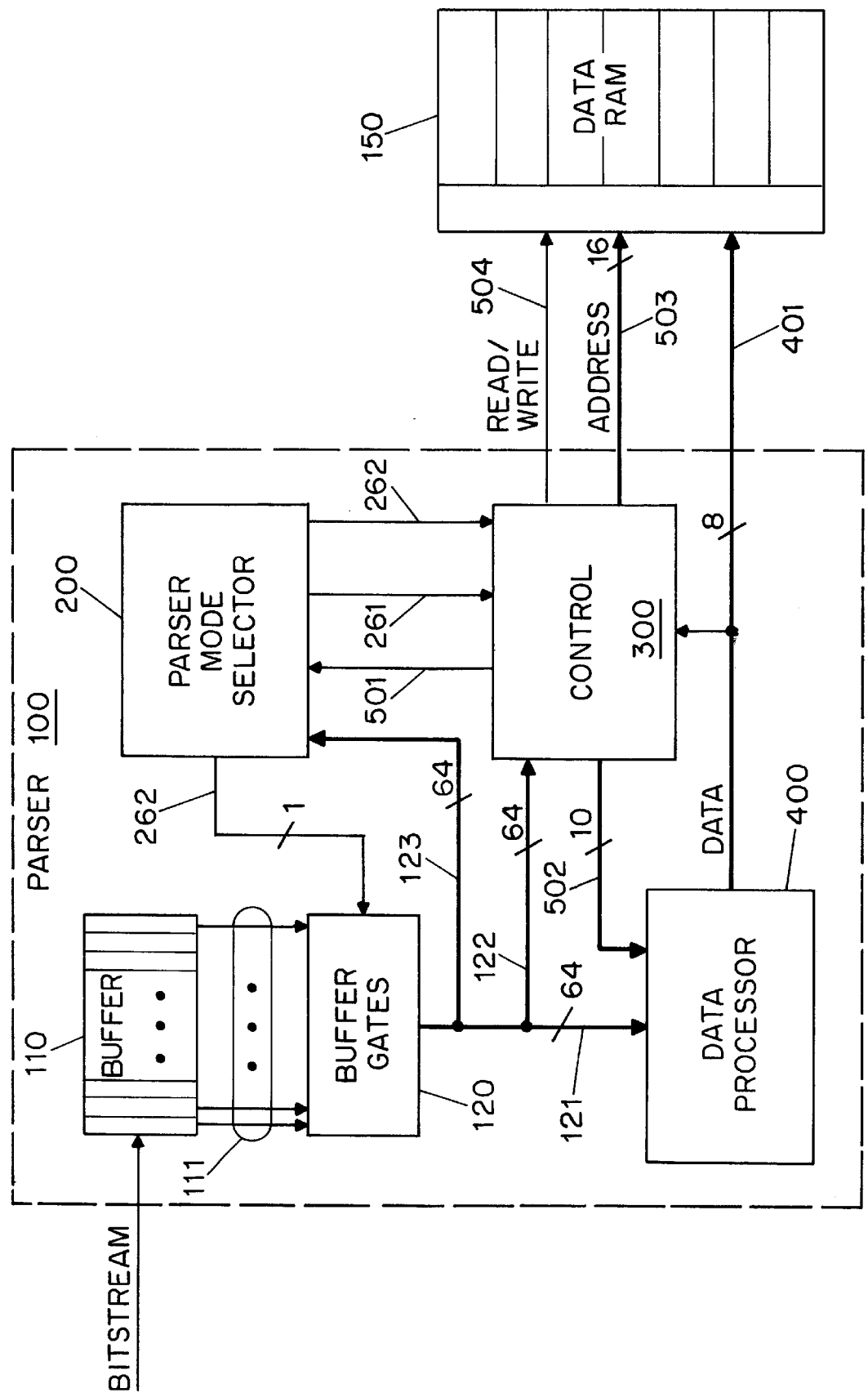
FIG. 1 is a system diagram of a programmable bitstream parser in accordance with the present invention.

Referring to FIG. 1, there is shown an exemplary embodiment of a programmable bitstream parser 100 in accordance with the present invention. The parser 100 is designed to read data from a bitstream, parse the data into semantically meaningful segments, and store the parsed data in appropriate memory positions in a data RAM 150. The bitstream may include both data and programming information, and should be delivered to the parser 100 in a serial fashion, i.e., one bit at a time at fixed time intervals.

The parser 100 includes shift buffer 110, buffer gates 120, parser mode selector 200, control 300, and data processor 400. The parser 100 is synchronous, and its components are controlled by a common system clock (not shown). Although the embodiment shown in FIG. 1 is designed to parse 64 bit wide segments of the incoming bitstream into 8 bit wide words for storage into data RAM 150, those skilled in the art will appreciate that with trivial modifications, parser 100 could be adapted to handle bitstream segments of other widths, e.g. 128 bits, or to parse such bitstream segments into words of any length, e.g., 16, 32, or 64 bits.

The size of the shift buffer 110, which may be a shift register, should be chosen so that it is capable of storing the largest parsable entity of the bitstream syntax, which is a design parameter. In the embodiment show in FIG. 1, the buffer can store a 64 bit wide segment from the incoming bitstream. Buffer 110 includes 64 parallel outputs 111, one for each bit of the bitstream segment which is stores at any given time.

Each parallel output 111 of buffer 110 is connected to a buffer isolation gate 120. The isolation gates 120, whose operation will be described in further detail below, are used to block or isolate certain bits stored in buffer 110 before the stored information is passed on to data processor 400 via data bus 121 or to control 300 via data bus 122.

At any given point in time, the parser can be in either a data (D) mode or a program (P) mode. In the D mode, the bitstream segment stored in buffer 110 represents data. In this mode, the data is parsed by data processor 400 into 8 bit words which are subsequently placed in memory locations in RAM 150 via data bus 401. Control 300 provides address locations to RAM 150 via address bus 503, and enables writing to the RAM 150 via read/write enable line 504.

In the P mode, at least a portion of the bitstream segment stored in buffer 110 represents binary commands or instructions that indicate a reconfiguration of the syntax for subsequent data in the bitstream. In this mode, the binary commands or instructions are loaded directly into control 300 in order to reprogram the parser 100. The details of this operation are discussed below.

Figure 2:
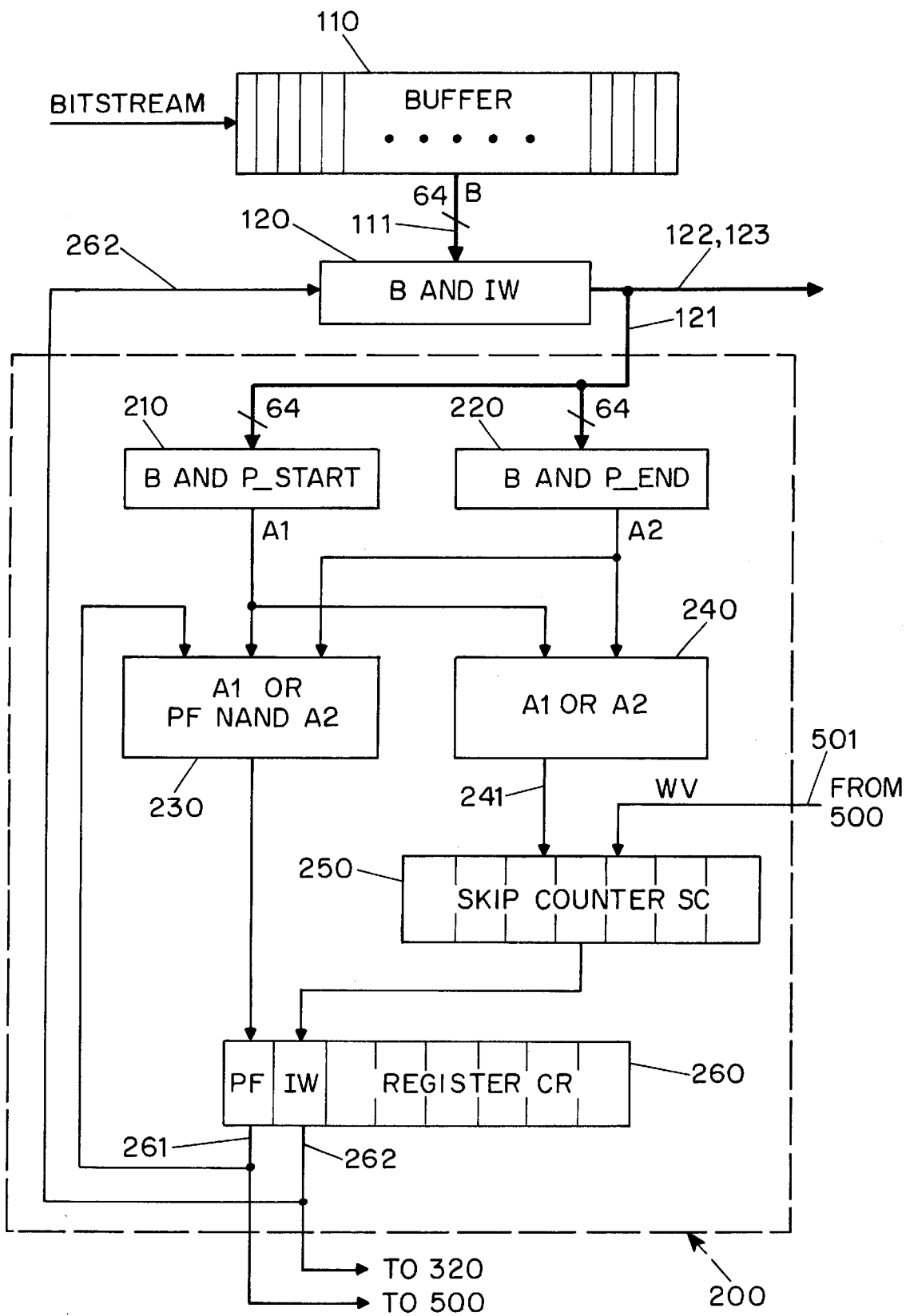
FIG. 2 shows a parser mode selection circuit useful in the FIG. 1 parser.

The parser mode selector 200 determines which mode the parser 100 should be in. Referring to FIG. 2, a preferred arrangement of the mode selector 200, buffer 110 and gate structure 120 are shown in greater detail.

In the embodiment show in FIG. 2, the D mode is a default mode, with the P mode being triggered by a special binary codeword (command code) included in the bitstream called P_START, and turned off with another special binary codeword called P_END. Exemplary values for all special command codes can be found in the Appendix. At the start of each clock cycle, logical circuitry in mode selector 200 checks the bitstream segment stored in buffer 110 for the presence of these special command codes and switches the parser mode when necessary.

The current mode is stored as the first bit of control register 260 (program flag, or PF). Control register 260 is an 8-bit register that stores pertinent state information needed for the coordination of the parser's operations. At the start of a clock cycle, shift buffer 110 reads 64 bits from the bitstream and shifts its contents to the right. The 64 stored bits B are compared to the P_START and P_END codewords in comparators 210 and 220, respectively, which each perform a logical AND operation. The outputs A1 and A2 of comparators 210 and 220, respectively, are fed to logic cell 230, which also received the PF flag from register 260 from line 261. Logic cell 230 performs the logical operation A1 OR PF NAND A2, to determine the new value of the flag PF. The PF flag is set to 1 when P_START is encountered, and is reset to 0 when P_END is encountered; in all other cases it retains its previous value.

While the P_START or P_END codes are necessary in order to determine whether the following bitstream segment represents data or programming information, the bits that represent the codes themselves are not otherwise useful to the parser, as they represent neither data nor programming information. Accordingly, when a P_START or P_END code detected, the bits which make up the code need to be isolated from the remainder of the parser. Bits that represent other codes which are discussed below must similarly be recognized and isolated.

For this purpose, the mode selector 200 includes logic which generates a input wait (IW) flag that is stored in control register 260. The outputs A1 and A2 of comparators 210 and 220, respectively, are fed to logic cell 240, which performs an OR operation, so that if either the P_START or P_END are present in the code, a signal indicative of the value of the P_START or P_END is placed on output line 241 logic cell 240. Input stepping counter 250 receives the output of logic cell 240 to be set thereby.

In the case of other codes which need to be removed from the stored bitstream segment, a wait value (WV) signal from control 300 is sent to counter 250 via line 501. In such case, the wait value signal sets the counter to a numerical value equal to the number of bit positions required by the code (from 1 to 64).

The input step counter 250 is 7-bits wide, to be able to handle up to and including 64 steps. The counter 250 counts the number of bits held in buffer 110 that are to be isolated. When the counter contains a non-zero value, an IW flag is present in register 260, with the appropriate gate 120 receiving the IW flag via line 262. The AND operation performed by the buffer isolation gates 120 effectively isolate the appropriate buffer 110 positions which store bits that represent the code.

When the counter 250 is set to a specific value, the parser 100 waits while an equal number of bits are inserted into the shift buffer from the input bitstream, while the isolated bits are shifted out. In this manner, bits which correspond to codes are removed, and only bits that represent data or programming information are passed through the gates 120 and on to the data processor 400 or control 300.

In order to properly parse the input bitstream, control 300 must store appropriate state information that will govern the sequence of steps that need to be taken by the data processor 400. The control 300 can store information that controls the parsing of one or multiple parsable objects. Where more than one type of parsable object is present in a bitstream, the bitstream must include appropriate identification information in order for the control to determine which state information to use to parse the current object. Such information can be provided by special object identification codewords that immediately precede each object. The parser uses this information to determine which "program" to use for the current object.

Figure 3:
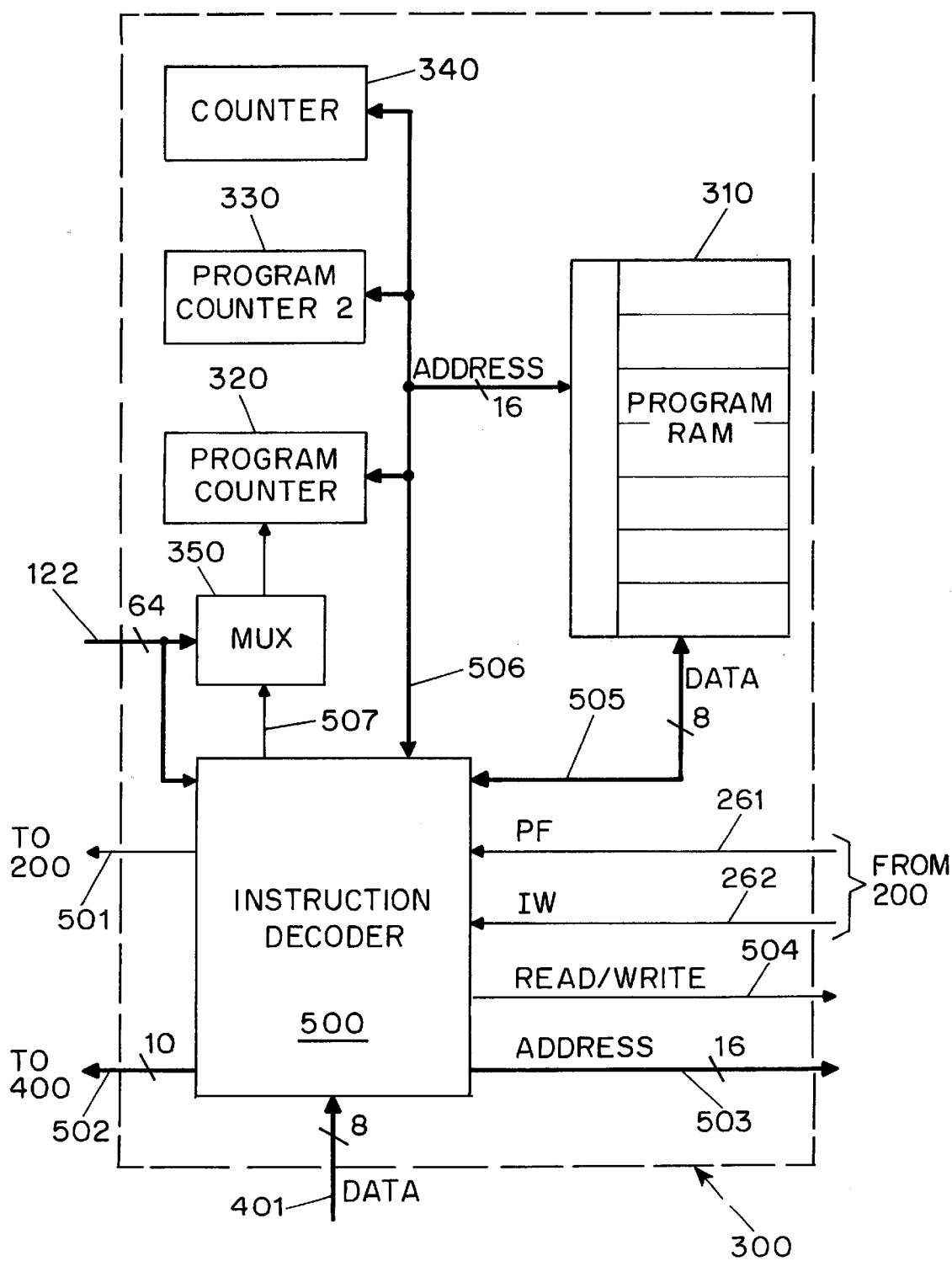
FIG. 3 shows a control circuit useful in the FIG. 1 parser.

As shown in FIG. 3, control 300 includes program RAM 310, instruction decoder 500, program counter 320, additional counters 330 and 340, and multiplexer 350. The command codes which control the operation of the parser are stored in program RAM 310, which in the embodiment shown in FIG. 3 can store codes as 8-bit words. When the parser is in the D mode, the control 300 sequences through the instructions stored in program RAM 310 in order to parse the bitstream. The sequencing is performed by a program counter (PC) 320, which supplies addresses to RAM 310 by address bus 506.

The PC 320 is reset by instruction decoder 500 whenever the mode selector 200 returns the parser to the D mode, and is advanced as each instruction is completed. The advance of the PC is suspended by instruction decoder 500 when the input skip counter (SC) 250 is activated, as indicated by IW flag via line 262. When multiple objects are supported, reset occurs only when the downloaded program affected the object currently being parsed by data processor 400, if any. This allows downloading of code while another object is being parsed.

The retrieved instruction is fed to the instruction decoder 500 via program RAM data bus 505. The instruction decoder 500 determines how the next segment of data will be parsed, and how many input bits which represent object identification codewords should be discarded, i.e., the value loaded to the skip counter SC 501. The instruction decoder will be described in further detail below.

When an instruction requires than 1 word, instruction decoder 500 increments the PC 320 to obtain more data from program RAM 310 as appropriate. A program instruction is terminated by the code END; the PC 320 is then reset to its original value so that parsing of the next object can commence.

When the mode selector 200 determines that the parser in the P mode, as indicated by the PF flag on line 261, the programming information contained in the incoming bitstream is utilized by control 300 as follows. The P_START code recognized by the mode selector 200 is followed by an address in program RAM 310 where the programming information should be stored. The address and programming information is received by control 300 via data bus 122 in exactly the same way as it should be stored in the program memory, which is controlled by the creator of the program prior to its insertion in the bitstream for downloading. Hence the control 100 only needs to transfer all bytes succeeding the P_START code (and the start address) to the specified program RAM address, stopping when it encounters the P_END code.

If the system only supports single object parsing, after the P_END code is encountered the PC is reset to the address where the program was loaded. If multiple object parsing is supported, then the reset occurs only if the downloaded code affected the object currently being parsed, if an object is being parsed by data processor 400.

Figure 4:
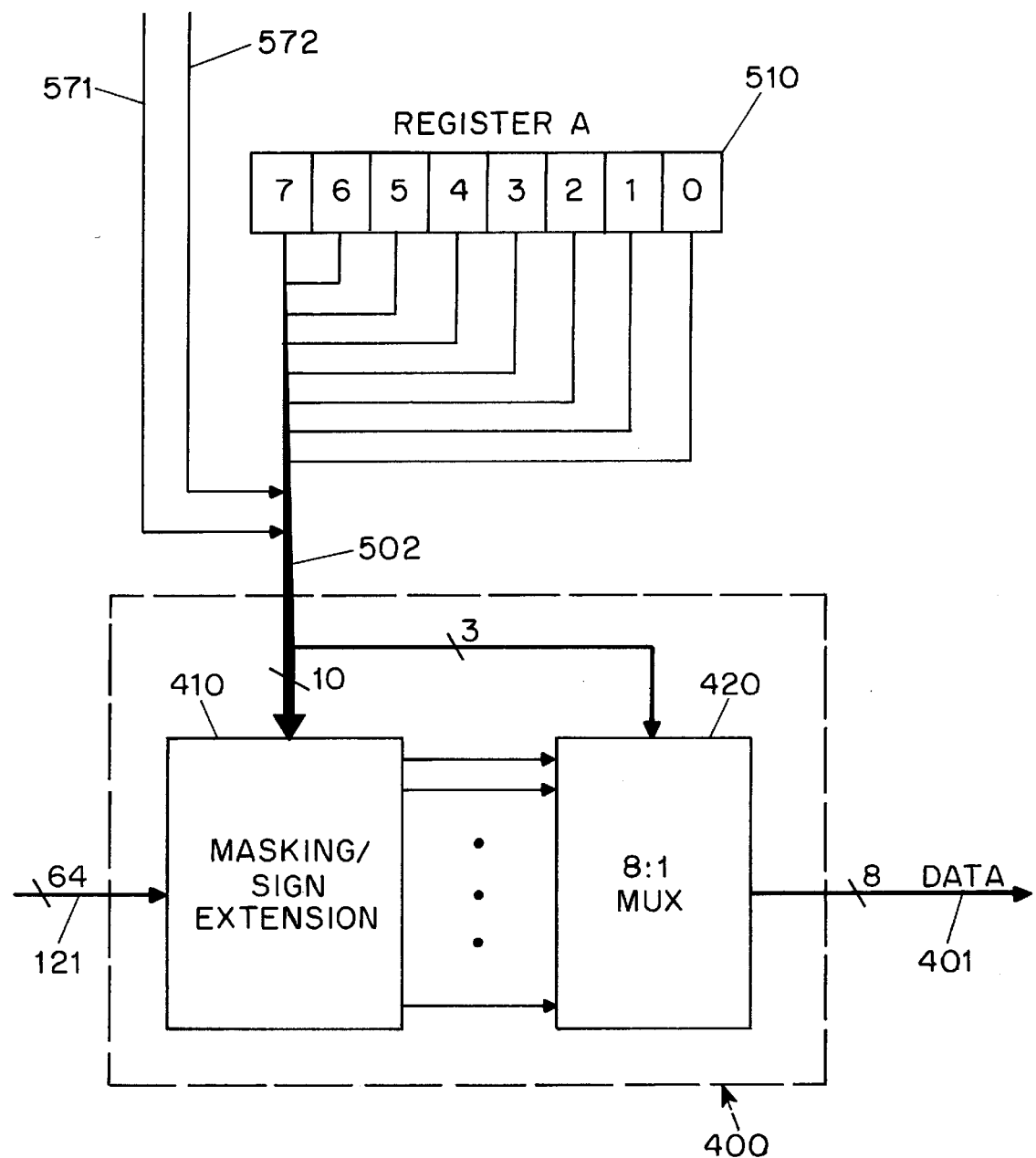
FIG. 4 shows a data extraction unit useful in the FIG. 1 parser.

Referring to FIG. 4, data processor 400 includes a masking and sign extension unit 410 (MSU), and a multiplexer 420. The MSU 410 receives the 64-bit wide bitstream segment from buffer 110 via data bus 121. MSU 410 also receives 8 bits of command information, a sign extension signal 571, and an enabling signal 572 from the instruction decoder 500 via bus 502.

The command information, which is stored in a Register A 510 of the instruction decoder 500, determines how may bits from the bitstream segment should be considered by the MSU 410; the remaining bits are discarded. The five high order bits stored in Register 510 indicate the length of the parsed field, in bytes, minus 1, which is the result of an integer division by 8. In the embodiment shown in FIG. 4, only the bits in positions 3–5 of register 510 are required for this purpose, since the largest parsable entity is 64 bits wide. Thus, only the register outputs from bit positions 3–5 are connected to MUX 420, so that from one to eight bytes of data may be transferred to data RAM 150 via data bus 401.

Therefore, when the MSU is enabled via line 571, it sign extends the bits which it is directed to use via the signal on line 572, and transfers single or multiple byte long objects to the data RAM 150 by way of the 8:1 MUX 420. This data is stored in data RAM 150 at addresses which are determined by the instruction decoder, as explained below.

Figure 5:
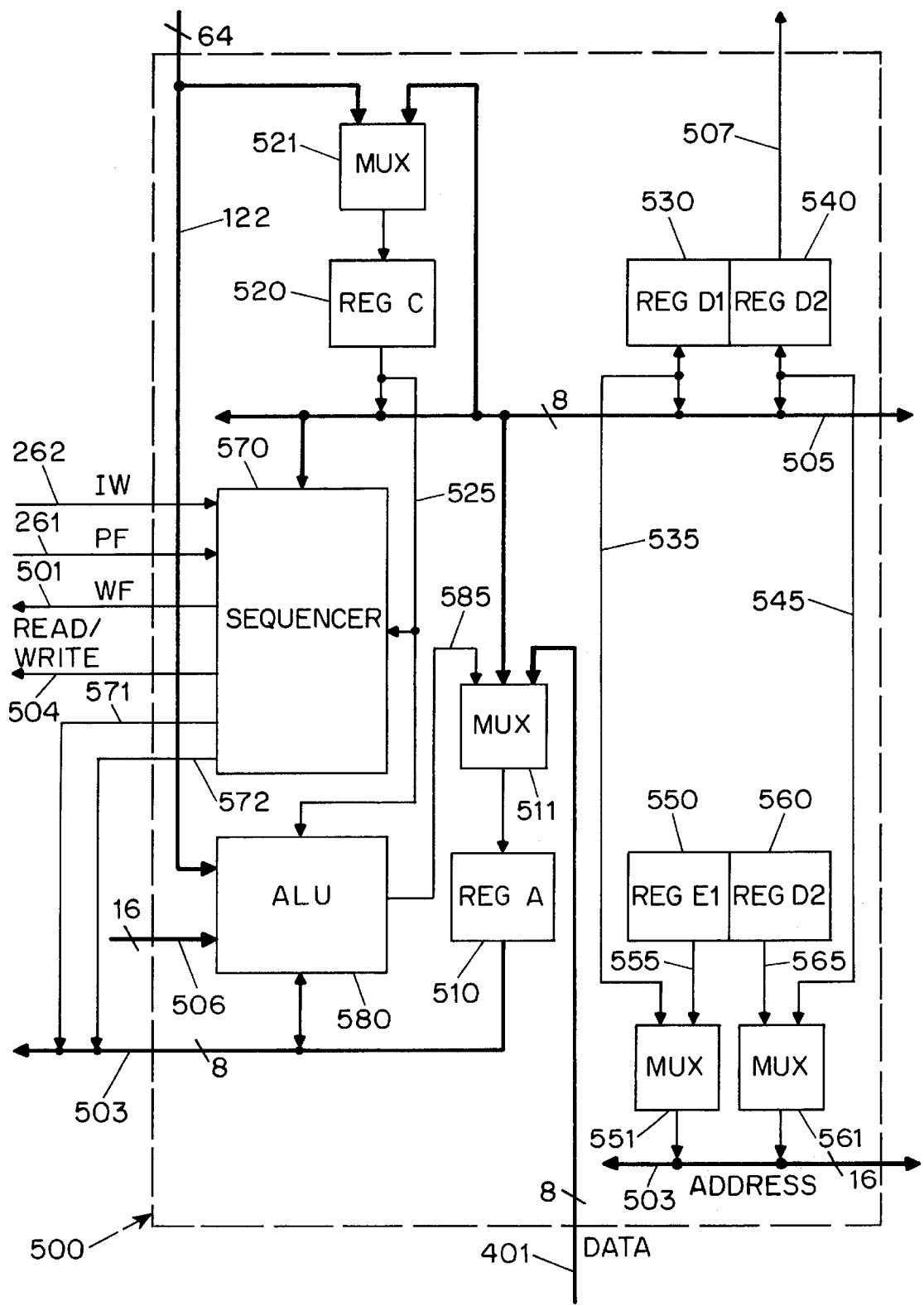
FIG. 5 shows a instruction decoder useful in the FIG. 3 control circuit.

Referring now to FIG. 5, the instruction decoder 500 is explained in greater detail. The instruction decoder includes a set of registers 510, 520, 530, 540, 550, and 560, associated MUXs 511, 521, 555 and 565, a sequencer 570, and an arithmetic and logic unit 580. The instruction decoder 500 is the coordinating circuit for the parser 100.

Sequencer 570 is a state machine that enables control signals at appropriate intervals according to the inputs which it receives. As shown in FIG. 5, the sequencer receives the above-discussed IW and PF flags from the mode selector 200 via lines 261 and 262, as well as programming information from the program RAM 310 via program RAM data bus 505, and new programming information from data bus 122 via MUX 521, register C 520, and output line 525. In addition to providing enabling and sign extension signals to data processor 400 and the wait value signal to mode selector 200, the sequencer also provides a read/write enable signal to the external data RAM 150 via line 504, and controls the overall operation of the instruction decoder 500 by way of command lines (not shown) to each component listed above, as well as to MUX 350 and counters 320, 330 and 340 shown in FIG. 3.

Referring again to FIG. 3, when the parser is placed in the program mode, as indicated by the presence of the PF signal on line 261, the two bytes of information which immediately follow the P_START code are routed to the program counter 320 by data bus 122 and MUX 350. The value which the program counter held in the immediately previous cycle, which, as further discussed below, remains important when parsing fields are indirectly represented, is simultaneously routed to a second program counter 330. The value stored in the program counter 320 represents the beginning address in program RAM 310 where new programming information is to be stored.

Subsequent bytes of information are not routed to the program counter 320, but instead are routed to register C 520 via MUX 521. The first byte of information routed to register C is loaded into program RAM 310 via bus 505 at the address stored in program counter 320. As additional bytes of information are routed to register C, the program counter 330 is incremented by a control signal from the sequencer (not shown), and the additional bytes of information are likewise stored in program RAM 310 at such incremented address locations. When the P_END code is encountered, the PF signal goes to 0, and the sequencer 570 resets the program counter 320. Normal data mode operations resume.

In the data mode, programming information stored in the program RAM 310 are loaded into register C 520, with the number of bits of the current bitstream segment to be parsed is stored in register a 510. Registers D1 and D2 530, 540, are used to obtain addresses from the program RAM 310 that are used in the case of indirect parsing representations. Registers E1 and E2, 550, 560, are used to supply address values to the external data RAM 150 via address bus 503, so that parsed data can be stored in the data RAM 150 at an appropriate location.

With control 300, the parser 100 can parse several different types of data syntax, including constant-length direct representation bit fields or "Fixed Length Codes" (FLCs), which include the encoded value as it is to be used by the decoder/receiver, variable length direct representation bit fields or "variable length FLCs," which are FLC for which the length is determined by the context of the bitstream (i.e., another field that has previously appeared), constant-length indirect representation bit fields, which require an extra lookup into an appropriate table, and variable-length indirect representation bit fields, i.e., traditional Huffman codes. The operation of control 300 in the data mode will now be described in the context of these varying data syntaxes.

EXAMPLE 1

Fixed-Length Codes

This is the simplest bit field, and is described by a command code which identifies the type of data to be parsed followed by one byte that indicates the number of bits used in the representation. An example is a 3-bit integer. Table 1 depicts the command format, were PC indicates the starting address loaded into program counter 320.

TABLE 1

| Position | Content | Description |
| --- | --- | --- |
| PC | CODE | Data type |
| PC+1 | length | Length in bitstream |

With reference to Table 1, when the parser 100 receives an object identification code which identifies the byte of data stored in program RAM 310 at the address PC, the command stored in RAM 310 at address PC is loaded into register C, informing the sequencer that a fixed-length code is to be parsed. The sequencer 570 increments the program counter 320 by 1, thereby permitting the program counter to read the address in program RAM 310 which holds the length value for the corresponding object in the bitstream. This value is placed in register A via the program RAM's data bus 505 and MUX 511, and used by data processor 400 to properly parse the current bitstream segment, as discussed 15 above.

Table 2 indicates various codes may be used to signify various types of fixed-length codes. In Table 2, "expanded size" indicates the size of the parsed quantity after it is parsed.

TABLE 2

| Type | Code | Expanded Size |
|---|---|---|
| int | INT_D | 32 |
| unsigned int | UINT_D | 32 |
| char | CHAR_D | 8 |
| unsigned char | UCHAR_D | 8 |

EXAMPLE 2

Variable-Length FLC's

Variable-length direct representation bit fields are similar to the constant-length ones, with a difference being that the size of the bit field is determined by a variable in the external data RAM 150, rather than in the program RAM 310. This allows an already parsed field to determine the length of a future field. An example is an integer whose length is determined by a field that has previously been parsed. Table 3 shows the command format of such codes.

TABLE 3

| Position | Content | Description |
|---|---|---|
| PC | CODE | Data type |
| PC+1 | addr0 | First byte of address of value in data RAM that determines length |
| PC+2 | addr1 | Second byte of address of value in data RAM that determines length |

With reference to Table 3, when the parser 100 receives an object identification code which identifies the byte of data stored in program RAM 310 at the address PC, the command stored in RAM 310 at address PC is loaded into register C, informing the sequencer in this case that a variable-length FLC is to be parsed. In such a case, the sequencer 570 initiates two additional read cycles from the program RAM 310 in order to read the addr0 and addr1 bytes, which are temporarily stored in registers D1 and D2 530, 540. The sequencer 570 then uses the values stored in registers D1 and D2 to address the external data RAM 150 via lines 535, 545, MUX's 555 and 565, and address bus 503. Data at the indicated program RAM 150 addresses is retrieved via program RAM data bus 401, fed through MUX 511, and stored in Register A 510 to inform the data processor 400 of the appropriate number of bits to parse.

Table 4 indicates the various codes may be used to signify various types of variable-length FLC's.

TABLE 4

| Type | Code | Expanded Size |
|---|---|---|
| int | INT_I | 32 |
| unsigned int | UINT_I | 32 |
| char | CHAR_I | 8 |
| unsigned char | UCHAR_I | 8 |

EXAMPLE 3

Constant-Length Indirect Representation Bit Fields

Indirect representation bit fields require the use of a table that maps the parsed input value to a set of actual values for the parsed parameter. When the parsed input has fixed length it is a constant-length indirect representation, while a parsed input having variable length is variable-length or Huffman code. Such parsing tables are stored in a separate area of the program RAM 310. As shown in Table 5, a parsing table has one index column and one or more output columns (hence it defines a one-to-many mapping), where each output column may have its own data type.

TABLE 5

| Index | Value 1 (int) | Value 2 (char) |
|---|---|---|
| 0 | 42 | 4 |
| 1 | −58 | −1 |

When the parser is in the program mode, a map may stored in the program RAM 310 in the following manner. First, the length of the index column (in bits) is stored in the first byte, the number of value columns is stored in the second byte, and the number of bytes to skip to get at the index of the first row is stored in the third byte. The data type of each value is then stored in subsequent bytes using abstract, direct, or indirect representation codes. Finally, the actual data is stored, one row at a time, including the index value; each value (except the index) is preceded by an "escape" byte, while the index is immediately followed by the number of bytes to skip in order to go to the representation of the next row (in order to facilitate quick jumps to subsequent rows without parsing the current one).

Abstract representation codes are special codes that just indicate the type of data as stored in the map (CHAR, UCHAR, INT, UINT). The use of an escape byte allows the insertion of direct and indirect representations that substitute actual values, to thereby permit an extra degree of sophistication in the map: the map's functionality can be extended to include "escape" codes that trigger parsing of further data from the bitstream in order to obtain the value of the mapping. An example of table mapping with an escape code is shown in Table 6.

TABLE 6

| Index | Value 1 (int) | Value 2 (char) |
|---|---|---|
| 00 | 42 | 4 |
| 01 | INT_D, 3 | −1 |

The map indicated in Table 6 is stored in program RAM 310 as indicated in Table 7, where integer values require four bytes and word values require one byte.

TABLE 7

| Address | 0 | 1 | 2 | 3 | 4 | 5 | 6 | 7 |
|---|---|---|---|---|---|---|---|---|
| A | 1 | 2 | 2 | INT | CHAR | 0 | 7 | 0 |
| A+8 | 0 | 0 | 0 | 42 | 0 | 4 | 1 | 8 |
| A+16 | 1 | INT_D | 3 | 0 | −1 | | | |

Thus, referring to the five top left entries in Table 7, the map indicated in Table 6 has an index that is one bit long (index values 0 and 1), has two value columns, requires two bytes to be skipped to goto the index of the first row and has INT and CHAR data types. Proceeding from the sixth entry in Table 7, the first index is 0, the row skip value is seven, the first escape byte is 0, the first data entry is 0, 0, 0, 42 (integer), the second escape value is 0, the second data entry is 4 (character), the second index value is 1, and so on.

As illustrated, each data value is preceded by its escape flag; the flag is set to one only before the element in position A+17, to trigger the escape to INT_D, 3. Accordingly, if the value 1 is encountered in the bitstream, then in order to obtain the value for the first column entry the parser will need to parse 3 subsequent bits from the bitstream. Such representation avoids the need to specify an INT_I plus the address, to indicate a variable length constant representation entry. Note that the escape types must be of the same type as the column they appear in.

The map type object identification code is indicated by a special code (MAP) stored in the program RAM 310, followed by the address where the map's description is stored. The command format for such codes are depicted in Table 8.

TABLE 8

| Position | Content | Description |
|---|---|---|
| PC | MAP | Map code |
| PC+1 | addr0 | First byte of address of map's definition in data RAM |
| PC+2 | addr1 | Second byte of address of map's definition in data RAM |

With reference to Table 8, when the parser 100 receives an object identification code which identifies the byte of data stored in program RAM 310 at the address PC, the command stored in RAM 310 at address PC is loaded into register C, informing the sequencer that a MAP type data format is to be parsed. In such a case, the sequencer 570 initiates two additional read cycles from the program RAM 310 in order to read the add0 and addr1 bytes, which are temporarily stored in registers D1 and D2 530, 540. The value in program counter 320 is shifted to counter 330, and the value in the registers D1 and D2 is shifted to the program counter 320.

The next memory addresses, i.e., the length of the index, the number of value columns, and the number of bytes to skip are retrieved and stored in register C 520, sequencer 570, and register A 510, respectively. At this point, the program counter 320 indicates the address of the first data type; this value is stored in the extra counter 340 for possible use if a match is found. The number of bytes to skip, stored in register A 510, is added to the value held in the program counter 320 to indicate the address of the first index, which is loaded into Register A and compared by ALU 580 with the input. If there is no match, the next program data byte is read in order to jump to the next index.

Where there is a match, the sequencer 570 increments the program counter 320 by one, to bypass the skip byte address, and sends a wait value flag via line 501 to the mode selector 200 so that the shift buffer 110 is shifted by the number of bits indicated in register C. The new address indicated by program counter 320 corresponds to the escape flag, which is loaded into register C 520. If the value loaded into register C is non-zero, the command that immediately follows is executed, and there is no need to use the value previously stored in the counter 340.

If, however, the value of the escape flag is zero (e.g., a non-escaped value), the sequencer exchanges the values stored in counters 320 and 340, thereby placing the address of the data type previously stored in counter 340 into counter 320 in order to retrieve the data type from the program RAM 310. This value is stored in register C 520. The values stored in counters 320 and 340 are then again swapped, to return the value held by program counter 320 to indicate a data address. The data at this address is retreived from program RAM 310 and placed into register A.

After parsing of the field is completed, the values stored in registers 320 and 340 are again exchanged, and the sequencer proceeds to locate the instruction for the second field. This process is continued until all MAP columns entries are exhausted.

EXAMPLE 4

Variable-Length Indirect Representation Bit Fields

Variable length indirect representation bit fields differ from their constant-length counterparts in that the length of the index column is not fixed. For example, the map show in Table 6 could be modified as shown in Table 9:

TABLE 9

| Index | Value 1 (int) | Value 2 (char) |
|---|---|---|
| 0b0 | 42 | 4 |
| 0b10 | INT_D, 3 | −1 |

The notation '0b' is used to denote a binary number (similar to '0x' for hexadecimal). As shown in Table 9, the index values have different lengths (1 and 2). This is a very common situation in actual audio and video encoders, and allows for a reduction of the average number of bits necessary to represent a given quantity if the values are not equiprobable, so that more probable values are assigned shorter indices.

The map format described above can be used to store such information in the program RAM 310; modifications are necessary, however, in order to account for the varying index size. More specifically, the storage of the table is modified by storing the number of value columns is in the first byte, and the number of bytes to skip to get at the index of the first row in the third byte, with the data type of each value being stored in subsequent bytes using abstract, direct, or indirect representation codes. Finally, the actual data is stored, one row at a time, including the index value preceded by its length. Each value, except the index, is preceded by an escape byte. The index is followed by the number of bytes to skip to go to the representation of the next row, thus permitting quick jumps between rows without additional parsing.

For example, the map of Table 9 would have an in-memory representation as illustrated in Table 10.

TABLE 10

| Address | 0 | 1 | 2     | 3    | 4 | 5  | 6 | 7 |
|---------|---|---|-------|------|---|----|---|---|
| A       | 2 | 2 | INT   | CHAR | 1 | 0  | 4 | 0 |
| A+8     | 0 | 0 | 0     | 42   | 0 | 4  | 2 | 1 |
| A+16    | 5 | 1 | INT_D | 3    | 0 | −1 |   |   |

The command code used to trigger variable-length indirect representation bit fields is VMAP, which is followed by the address of the program description in the program RAM. Table 11 shows the format of variable-length indirect representation bit fields.

TABLE 11

| Position | Content | Description |
|----------|---------|-------------|
| PC       | VMAP    | Variable length map code |
| PC+1     | addr0   | First byte of address of map's definition in data RAM |
| PC+2     | addr1   | Second byte of address of map's definition in data RAM |

The parsing operations are identical to those described in Example 4 above, with the only difference lying in the fact that the index length is not obtained from the map's header, but directly from the byte preceding the index.

EXAMPLE 5

General Arithmetic and Flow Control

In many practical coding situation, the bitstream syntax may be controlled-by context, with the presence of a field being determined by the value of an already parsed parameter. Similarly, the number of fields present may be controlled by some parameter. This dependence may also not be direct, in the sense that the actual value may be an expression involving bitstream parameters and not the value of any specific parameter. For these reasons, the instruction decoder includes a general purpose arithmetic and logic unit (ALU) 580. The commands listed in Table 12 are supported by ALU 580.

TABLE 12

| Command   | Operation              | Description |
|-----------|------------------------|-------------|
| LOAD addr | A←RAM [addr]           | Load from data memory location |
| STO addr  | RAM [addr]←A           | Store to data memory location |
| ADD addr  | A←A+RAM [addr]         | Add memory location to accumulator |
| SUB addr  | A←A−RAM [addr]         | Subtract memory location from accumulator |
| JNZ addr  | if A≠0 then PC←addr    | Jump to memory location if accumulator is not 0 |

With reference to Table 12, 'A' indicates the ALU's accumulator, i.e., register A 510, RAM[x] denotes the contents of external data RAM 150 at address 'x', and 'addr' is a two byte entity that addresses the data RAM via registers D1 and D2 530, 540.

As illustrated in the foregoing examples, the instruction decoder 500 can implement all different types of for and while loops, as well as general expression evaluation. The ALU 580 can be any off-the shelf unit which uses 2's complement arithmetic, and does not require a stack, a stack pointer or a "return" instruction.

Although the principals described in the foregoing specification are generally applicable to current image and video compression techniques such as JPEG, H.261, MPEG-1, MPEG-2, H.263, which require a particular bitstream sytax, the present invention has particular applicability to object-based compression techniques such as the MPEG-4 standardization effort by the ISO/IEC JTC1/SC29/WG11 group, which permits a variable bitstream sytax, as well as to any generic digital bitstream which has a varying syntactic configuration.

In the context of the proposed MPEG-4 standard and its associated MSDL-S language, the present invention provides both for programmability of the parser as well as for the separation of the bitstream parsing process from bitstream processing. As described herein, the parser can be programmed by the incoming bitstream in three general ways. First, the parser can be programmed to recognize certain high-level object identifiers (e.g., slices or tools, which may be tagged to the bitstream during encoding) and to redefine such objects during parsing. Second, the parser can be programmed to recognize certain context-sensitive objects, i.e., objects that require the presence of other objects to be recognizable (an "if then else" object description). Third, the parser can be programmed to recognize certain repetitive objects and to apply the same syntax to parse the repetitive bitstream until some condition is met (a "for while do" object description). Accordingly, those skilled in the art will appreciate that the foregoing description presents a bitstream parsing technique that is fully adaptable to the syntax used in a digital bitstream without the requirement of interrupting the parsing operation to reprogram the bitstream parser every time a new syntax is encountered.

Although an exemplary embodiment was described herein, various modifications and alterations to the described embodiment will be apparent to those skilled in the art in view of the teachings herein. For example, while the parser 100 is designed to accept a serial bitstream, parallel input can also be accommodated, e.g., when the information is provided one byte at a time, simply by adding a parallel-to-serial converter using a shift buffer with parallel loading. In addition, while the mode selector described above is designed to compare the incoming bitstream to a P_START code and a P_END code, the logic of the mode selector 200 could be easily modified to handle other bitstream codes which may indicate the arrival of programming or data information. Likewise, while the described embodiment uses a special program RAM 310 to store command information, it is also possible to use the external data RAM 150 for the same purpose.

It will thus be appreciated that those skilled in the art will be able to devise numerous systems and methods which, although not explicitly shown or described herein, embody the principles of the invention and are thus within the spirit and scope of the invention.

Appendix

| Codeword Symbol | Value (Hex) | Description |
|---|---|---|
| P_START | 00 00 00 00 00 00 00 01 | Enter program mode (exiting data mode); following bytes indicate place in program RAM where program should be stored |
| P_END | 00 00 00 00 00 00 00 02 | Exit program mode (entering data mode) |
| NOP | 00 | No operation (ignored) |
| INT | 01 | Integer value, 32 bits |
| UINT | 81 | Unsigned integer value, 32 bits |
| CHAR | 02 | Character value, 8 bits |
| UCHAR | 82 | Unsigned character value, 8 bits |
| INT_D | 11 | Parse data of given length to a 32-bit integer; length follows in next byte and sign extension is performed as needed |
| UINT_D | 91 | Parse data of given length to a 32-bit unsigned integer; length follows in next byte |
| CHAR_D | 12 | Parse data of given length to an 8-bit integer; length follows in next byte and sign extension is performed as needed |
| UCHAR_D | 92 | Parse data of given length to an 8-bit unsigned integer; length's address in data RAM follows in next two bytes |
| INT_I | 17 | Parse data of given length to a 32-bit integer; length's address in data RAM follows in next two bytes and sign extension is performed as needed |
| UINT_I | 97 | Parse data of given length to a 32-bit unsigned integer; length's address in data RAM follows in next two bytes |
| CHAR_I | 18 | Parse data of given length to an 8-bit integer; length's address in data RAM follows in next two bytes and sign extension is performed as needed |
| UCHAR_I | 98 | Parse data of given length to an 8-bit unsigned integer; length's address in data RAM follows in next two bytes |
| MAP | F0 | Fixed-length mapped data; address of map definition in program RAM is indicated in the following two bytes. |
| VMAP | F1 | Variable-length mapped data; address of map definition in program RAM is indicated in the following two bytes. |
| LOAD | 10 | Load accumulator with value from data memory; address follows in next two bytes |
| STO | 20 | Store accumulator in data memory; address follows in next two bytes |
| ADD | 30 | Add data memory value to accumulator; address follows in next two bytes |
| SUB | 40 | Subtract data memory value from accumulator; address follows in next two bytes |
| JNZ | 50 | Jump to specified address if accumulator has non-zero value; address follows in next two bytes |
| END | FF | End of object parsing program |

What is claimed is:

1. A programmable bitstream parser for parsing a digital bitstream having both data information and programming information, and for providing parsed data to a data memory, comprising:

(a) a buffer for receiving and temporarily storing a segment of said digital bitstream;

(b) a mode selector, coupled to said buffer to determine whether one or more bits of said bitstream segment represent a mode selection code, and selecting a parser mode in response to said mode selection code to place said bitstream parser in a data mode when said mode selection code is a data mode selection code and in a program mode when said mode selection code is a program mode selection code;

(c) a control circuit, coupled to said buffer to receive and store one or more bits of said bitstream segment from said buffer when said bitstream parser is in said program mode and reprogramming said control circuit with newly received program information, and using said program information to generate one or more parsing signals when said bitstream parser is in said data mode; and (d) a data processor, coupled to said buffer and to said control circuit to receive one or more bits of said bitstream segment from said buffer and said parsing signals from said control circuit when said bitstream parser is in said data mode, parse said received bits in accordance with said parsing signals, and provide said parsed data to said data memory.

2. The apparatus of claim 1, wherein said buffer is a shift buffer having a plurality of parallel outputs for bits of said bitstream segment stored therein.

3. The apparatus of claim 2, wherein said shift buffer is a buffer having a size sufficient to store a number of bits required by a largest parsable entity of any syntax handled by said bitstream parser.

4. The apparatus of claim 2, further comprising one or more buffer isolation gates, each coupled to a respective one of said parallel outputs of said shift buffer, and to said mode selector, said data processor and said control circuit, said buffer gates receiving and isolating said parallel outputs of said shift buffer and providing one or more non-isolated bits of said bitstream segment to said data processor and said control circuit.

5. The apparatus of claim 4, wherein said program mode selection code is a start program code and said data mode selection code is a end program code, and wherein said mode selector includes a first logic circuit receiving one or more bits of said bitstream segment from said buffer isolation gates, said first logic circuit comparing said one or more bits of said bitstream segment with one or more bits of said start program code and with one or more bits of said end program code to generate a signal indicative of a program mode when a start code is determined from said comparing or when a program mode signal was generated in an immediately previous cycle and an end code is not determined from said comparing.

6. The apparatus of claim 5, further comprising a second logic circuit, coupled to said first logic circuit and to said buffer isolation gates, said second logic circuit generating a wait signal whenever said start program code or said end program code is determined by said first logic circuit, and providing said wait signal to said buffer isolation gates so that any gate corresponding to a bit position of said shift buffer containing a bit corresponding to said start program code or said end program code is disabled, thereby isolating said corresponding bit.

7. The apparatus of claim 1, wherein said control circuit comprises:

(i) a memory, coupled to said buffer to receive and store program information for said bitstream parser and to receive and store said one or more bits of new program information, and to reprogram said stored program information when said new program information is received by said control circuit; and (ii) an instruction decoder circuit, coupled to said memory and to said data processor to retrieve program information from said memory and generating said one or more parsing signals based on said retrieved program information.

8. The apparatus of claim 7, wherein said mode selector further comprises a logic circuit for generating a wait signal whenever a mode selection code is determined, and wherein said control circuit further comprises a program counter coupled to said logic circuit and to said memory to generate addresses of storage locations in said memory to retrieve program information therefrom whenever said wait signal is not generated.

9. The apparatus of claim 8, wherein said control circuit is coupled to said logic circuit and generates a wait value signal, said logic circuit being responsive to said wait value signal in generating said wait signal.

10. The apparatus of claim 7, wherein said mode selector generates a mode signal representative of a mode selected thereby, and wherein said instruction decoder is coupled to said mode selector to receive said mode signal therefrom.

11. The apparatus of claim 10, wherein said instruction decoder is coupled to said buffer and wherein said one or more bits of said bitstream segment are stored in said memory only when said instruction decoder receives said program mode signal.

12. The apparatus of claim 7, wherein said instruction decoder circuit is coupled to said data memory to retrieve data therefrom and said instruction decoder generating said one or more parsing signals based on said retrieved program information and attributes of said retrieved data.

13. A programmable bitstream parser for parsing a digital bitstream having both data information and programming information, comprising:

(a) temporary storage means for receiving and temporarily storing a segment of said digital bitstream, said temporary storage means having a plurality of parallel outputs corresponding to respective bit positions thereof;

(b) mode selection means coupled to said temporary storage means for determining whether one or more bits of said bitstream portion represent a mode selection code and for selecting a parser mode in response to said mode selection code, said bitstream parser being placed in a data mode when a data mode selection code is determined and in a program mode when a program mode selection code is determined;

(c) control means, including program memory means storing programming information therein, coupled to said temporary storage means for receiving and storing one or more bits of said bitstream segment in said program memory means when said bitstream parser is in said program mode and further including means for reprogramming said program with newly received programming information and means for generating one or more parsing signals in response to said stored programming information when said bitstream parser is in said data mode; and (d) data extraction means, coupled to said temporary storage means and to said control means, for receiving one or more bits of said bitstream segment from said temporary storage means and said parsing signals from said command means when said bitstream parser is in said data mode and including means for parsing said received bits in accordance with said parsing signals.

14. The apparatus of claim 13, wherein said temporary storage means includes means for isolating each of said parallel outputs of said temporary storage means, and means for providing one or more non-isolated bits of said bitstream segment to said data extraction means and said control means, and wherein said mode selection means further comprises:

(i) first logic means having means for receiving said one or more non-isolated bits, means for comparing said one or more bits with said data mode selection code with said program mode selection code, and means for generating a signal indicative of a program mode when a program mode selection code is determined by said comparing means or when a program mode signal was generated in an immediately previous cycle and a data mode selection code is not determined by said comparing means; and (ii) second logic means, coupled to said first logic means, for generating a wait signal whenever said data mode selection code or said program mode selection code is determined by said first logic means, and having means for providing said wait signal to said isolation means so that any of said parallel outputs corresponding to a bit position in said temporary storage means which contains a bit of said data mode selection code or a bit of said program mode selection code is isolated.

15. The apparatus of claim 14, wherein said control means further comprises instruction decoding means, coupled to said program memory means, to said data extraction means and to said second logic means, for retrieving programming information from said program memory means, and having means for generating said one or more parsing signals based on said retrieved programming information whenever said wait signal is not generated.

16. A method for parsing a digital bitstream having both data information and programming information comprising the steps of:

(a) receiving a segment of said digital bitstream in successive cycles;

(b) determining whether one or more bits of said received bitstream segment represents a mode selection code, said mode selection code comprising a data mode selection code or a program mode selection code;

(c) selecting a data mode when said data mode selection code is determined and a program mode when said program mode selection code is determined;

(d) storing one or more bits of said bitstream portion as new programming information when said program mode is selected;

(e) generating one or more parsing signals based on said stored programming information when said data mode is selected; and (f) parsing said received bitstream in accordance with said generated parsing signals.

17. The method of claim 16, wherein step (c) further comprises the step of isolating one or more bits of said received bitstream segment corresponding to said data mode selection code or to said program mode selection code.

18. The method of claim 16, wherein step (c) further comprises the steps of:

(i) comparing said one or more bits of said received bitstream segment to said data mode selection code and to said program mode selection code; and (ii) generating a signal indicative of a program mode when a program mode selection code is determined or when a program mode signal was generated in an immediately previous cycle and a data mode selection code is not determined.

19. The method of claim 18, wherein step (c) further comprises the steps of:
  (iii) generating a wait signal whenever said data mode selection code or said program mode selection code is determined; and
  (iv) isolating, in response to said wait signal, one or more bits of said received bitstream portion which correspond to said data mode selection code or to said program mode selection code.

20. The method of claim 19, wherein step (d) further comprises the step of reprogramming said stored programming information when said new programming information is received.

21. The method of claim 20, wherein said programming information comprises one or more command instructions and is stored in an addressable program memory and step (e) further comprises the steps of:
  (i) determining addresses of said program memory where command instructions are stored;
  (ii) retrieving said command instructions from said stored programming information in said program memory; and
  (iii) generating said one or more parsing signals based on said retrieved command instructions whenever said wait signal is not generated.

22. The method of claim 19, further comprising the step of generating a wait value signal determinative of the number of bits of said received bitstream segment to be isolated, said isolating step being responsive to said wait signal and to said wait value signal.

23. The method of claim 16, further comprising the step of providing said parsed data to a data memory.

24. The method of claim 23, wherein step (e) further comprises:
  (i) retrieving preselected data from said data memory;
  (ii) determining addresses of said program memory where command instructions are stored;
  (iii) retrieving said command instructions from said stored program information in said program memory; and
  (iv) generating said one or more parsing signals based on said retrieved command instructions and said retrieved data.

* * * * *

UNITED STATES PATENT AND TRADEMARK OFFICE
CERTIFICATE OF CORRECTION

PATENT NO.        : 6,512,775 B1
APPLICATION NO. : 09/297714
DATED             : January 28, 2003
INVENTOR(S)       : Eleftheriadis et al.

It is certified that error appears in the above-identified patent and that said Letters Patent is hereby corrected as shown below:

On Page 1, Column 1, line 5, please insert the following header and paragraph:

-- Statement Regarding Federally Sponsored Research or Development
This invention was made with government support under grant number 9703163 awarded by the National Science Foundation. The government has certain rights in the invention. --

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,512,775 B1 | Page 1 of 1 |
| APPLICATION NO. | : 09/297714 | |
| DATED | : January 28, 2003 | |
| INVENTOR(S) | : Eleftheriadis et al. | |

It is certified that error appears in the above-identified patent and that said Letters Patent is hereby corrected as shown below:

Title page, item [75]:

Inventors:    Inventor: "Alexandros Eleftheriades, New York"

should read

-- (75) Inventors:    Alexandros Eleftheriadis, New York --

Signed and Sealed this
Seventh Day of August, 2012

David J. Kappos
*Director of the United States Patent and Trademark Office*